United States Patent

[11] 3,633,273

[72] Inventors Garlington C. Wilburn;
George P. Michel, both of South Boston, Va.
[21] Appl. No. 19,628
[22] Filed Mar. 16, 1970
[45] Patented Jan. 11, 1972
[73] Assignee Westinghouse Electric Corporation
Pittsburgh, Pa.
Original application July 5, 1968, Ser. No. 742,722, now Patent No. 3,546,644.
Divided and this application Mar. 16, 1970, Ser. No. 19,628

[54] METHOD OF CONSTRUCTING ELECTRICAL WINDINGS
12 Claims, 40 Drawing Figs.

[52] U.S. Cl.................................................. 29/602, 29/605, 29/624, 72/379, 113/116 Y
[51] Int. Cl.................................................. H01f 7/06
[50] Field of Search................................... 29/605, 624, 602; 113/116 R, 116 W, 116 Y; 336/187, 223; 174/33, 34; 72/379; 310/213

[56] References Cited
UNITED STATES PATENTS
680,277  8/1901  Priest...................... 310/213
FOREIGN PATENTS
129,788  7/1919  Great Britain............... 310/213
394,212  1/1925  Germany..................... 174/34
1,017,264  10/1957  Germany................... 310/213

Primary Examiner—J. F. Campbell
Assistant Examiner—Carl E. Hall
Attorneys—A. T. Stratton, F. E. Browder and Donald R. Lackey ABSTRACT: Methods of forming a notch in the edge of sheet conductors to transpose the relative radial positions of sheet conductors in an electrical winding. The methods include folding the sheet material in a predetermined manner to provide a notch without cutting the material, and cutting, folding and joining the sheet materials to simplify the formation of the notch, while minifying the amount of conductive material removed from the sheet.

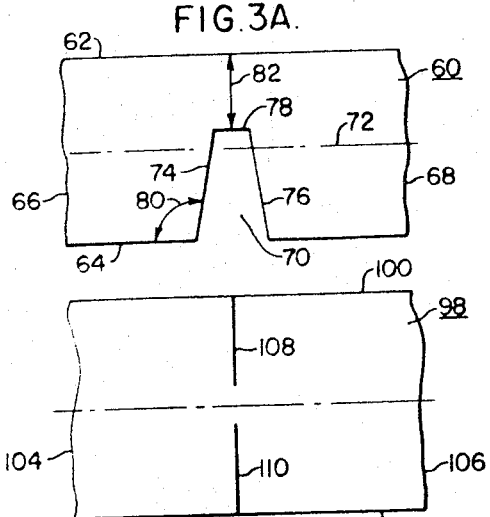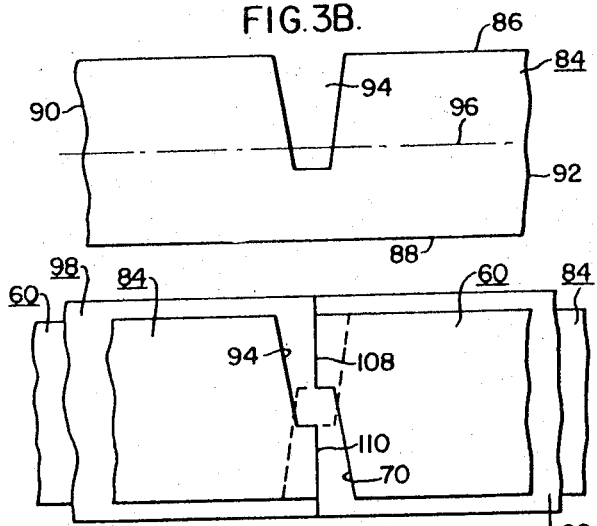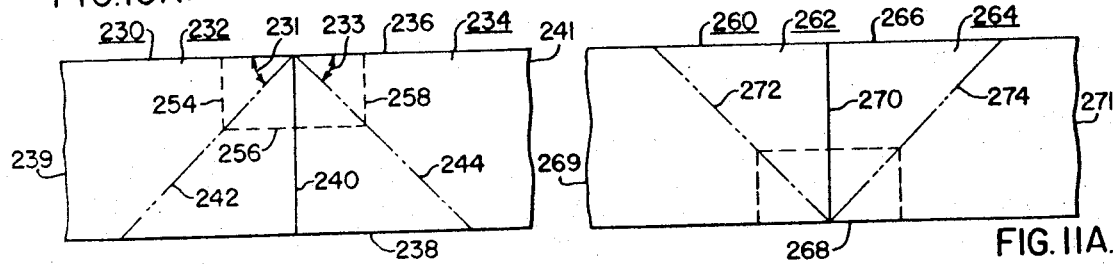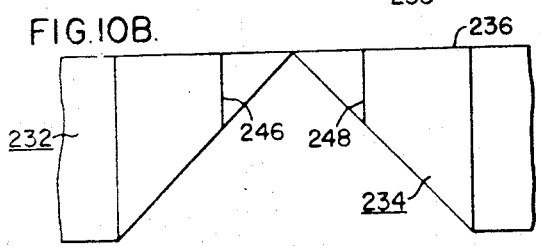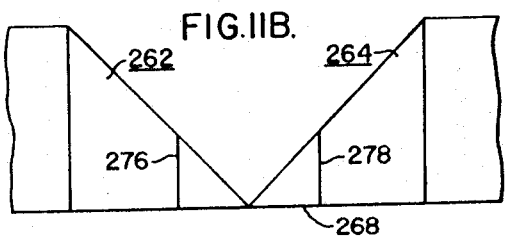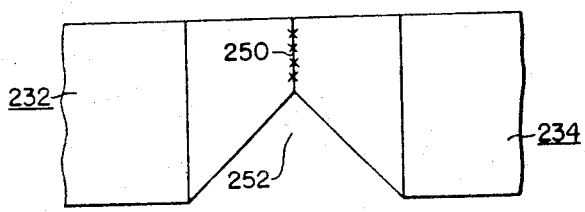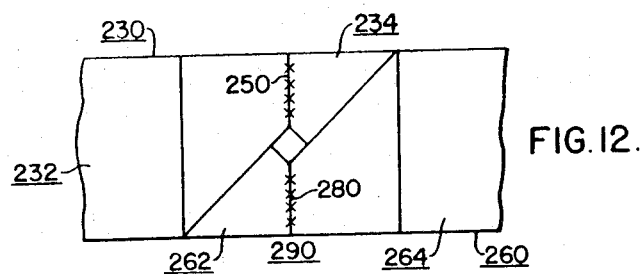

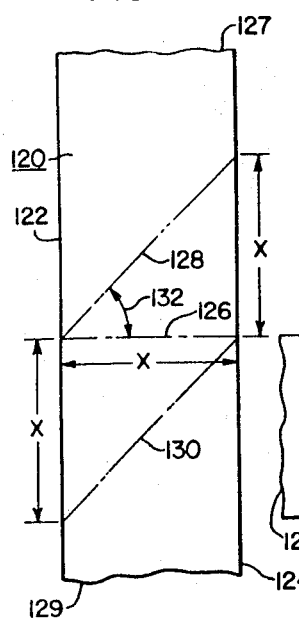
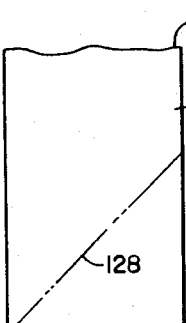
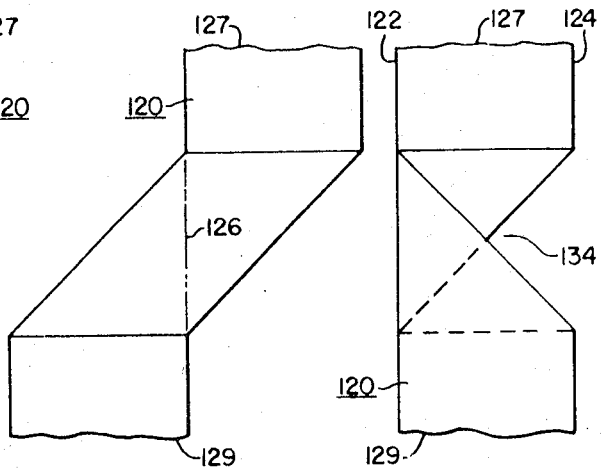
FIG.4A. FIG.4B. FIG.4C. FIG.4D.
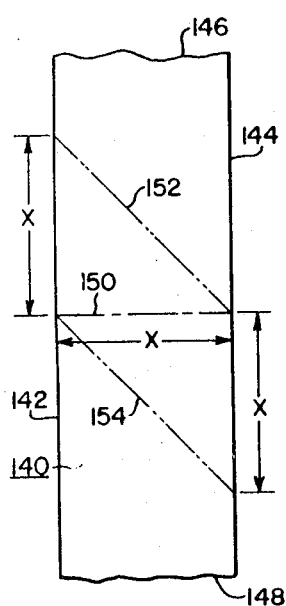
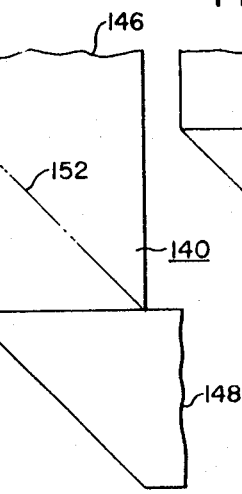
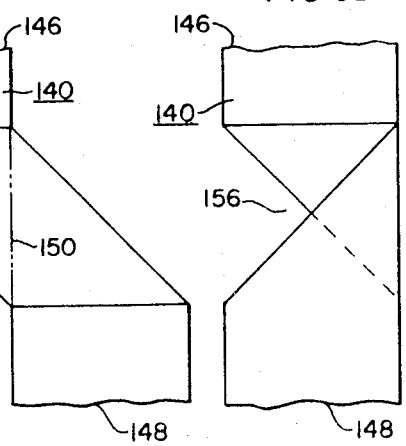
FIG.5A. FIG.5B. FIG.5C. FIG.5D.
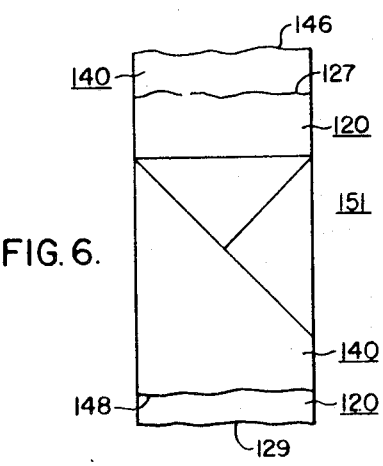
FIG.6.

3,633,273

METHOD OF CONSTRUCTING ELECTRICAL WINDINGS

CROSS-REFERENCE TO RELATED APPLICATION

This application is a division of application Ser. No. 742,722, filed July 5, 1968, now U.S. Pat. No. 3,546,644, which is assigned to the same assignee as the present application.

BACKGROUND OF THE INVENTION

1. Field of the Invention

The invention relates in general to windings for electrical inductive apparatus, such as transformers and reactors, and more particularly to methods of transposing the turns of such windings when they are formed of electrically conductive sheet material.

2. Description of the Prior Art

Constructing windings for electrical transformers of metallic foil, sheet or strip, has certain advantages over windings constructed of wire-type conductor. For example, windings constructed of wire or strap conductor require electrical insulation between radial layers of conductors, as well as turn-to-turn insulation, which increases the size of the winding. Further, with wire or strap wound windings, it is difficult to accurately determine the electrical center of the winding, i.e., the axial location which divides the ampere turns equally, especially when the winding is tapped. When the primary and secondary windings of the transformer are assembled in concentric adjacent relation, any axial displacement of these electrical centers creates a force during short circuit stresses which tends to force the windings axially apart.

Electrical windings constructed of sheet material, such as copper or aluminum strip or foil, wherein the winding includes a plurality of superposed conductor turns, require only turn-to-turn insulation, as the conductor turns extend across the axial dimension of the winding; or, where axially aligned, electrically connected part-coils are used, the conductor of each part coil wound extend across the axial dimension of its associated part coil. Since the turn-to-turn voltages are relatively low, the turn-to-turn insulation may be a relatively thin strip of insulating material, such as kraft paper, which is wound between the conductor turns at the time the winding is constructed. Or, the insulation may be a thin coating of a suitable insulating enamel applied to one or both of the major opposed surfaces of the sheet material. Thus, the space factor of the sheet conductor winding is excellent, resulting in a smaller winding which reduces the size of the magnetic core and the casing, and thus reduces the size, weight and cost of the transformer. Also, since the electrical center of a winding constructed of sheet material is the same as its mechanical center, there will be less force tending to axially separate concentrically disposed windings during short circuit stresses. There are virtually no vertical (axial) forces because there is no vertical (axial) displacement of electrical centers when the coils are sheet or foil wound. The sheet type winding is also inherently stronger than a winding formed or wire or strap conductor, as the individual conductors may be deformed by short circuit stresses, eventually causing turn-to-turn and layer-to-layer short circuits, due to abrasion of the insulation between contacting wires, while the sheet conductor turns resist deformation, and are not as subject to movement and vibration which may abrade and wear the insulation between the conductors.

When the current rating of a winding is increased, more conductor cross-sectional area is required to carry the current, if the winding temperature is to be maintained below the maximum temperature allowable for the class of insulation used. However, since eddy current losses are proportional to the square of the dimension of the conductor at right angles to the direction of the leakage flux, it is common to subdivide the required conductor area into two or more parallel connected conductive elements, which are electrically insulated from one another except at their common connections at the start and finish of the winding, and at any tap connections on the winding. The stranding of the conductor is easily accomplished with wire, strap, or sheet conductive material. Using wire or strap, the required plurality of strands are electrically insulated from one another, and then they may be taped together to form a single structure which facilitates winding. In sheet type windings, the required number of sheet conductors are wound simultaneously in superposed relation, with electrical insulating means being disposed between the conductors.

Subdividing the conductive cross-sectional area required into a plurality of parallel connected elements, however, introduces losses due to circulating currents in the parallel connected loops. Losses due to circulating current may be reduced by transposing the relative positions of the conductive elements, in an effort to subject each element to the same net leakage flux, and, therefore, equalize the induced voltages in the various elements and provide a net induced voltage around each loop of substantially zero. When using wire or strap conductor the transposing of the individual strands is relatively easy, with a number of transposing arrangements being known in the art for transposing any number of parallel connected strands.

Transposing the relative radial positions of a plurality of sheet conductors, which are wound about a winding tube or form, each from a separate roll of sheet material, and with the conductor turns all being in superposed or nested relation, presents a much more difficult problem. The transposing arrangement and methods of accomplishing the transposition should perform the necessary radial interchange of sheet conductors, without being unduly complicated, without substantially reducing the cross-sectional area of the conductor, and without substantially increasing the physical size of the winding.

SUMMARY OF THE INVENTION

Briefly, the present invention discloses methods of constructing notches in the edges of the sheet materials, in order to transpose the relative radial positions of conductor turns in a winding formed of the sheet material. The disclosed methods provide notches in the edges of the sheet material without substantially increasing the current density in the portion of the sheet material which is narrowed by the notch. One of the methods discloses folding the sheet material along three bend lines, which forms a notch without cutting the sheet material. Another method discloses cutting the sheet and folding each portion to form the notch, while building up the cross-sectional area of the sheet in the narrow portion adjacent the notch.

BRIEF DESCRIPTION OF THE DRAWINGS

The invention may be more readily understood when considered in view of the following detailed description of exemplary embodiments thereof, taken in connection with the accompanying drawings, in which:

FIGS. 3A and 3B illustrate two electrically conductive sheet materials prepared for making a transposition;

FIG. 3C illustrates a sheet of insulating material which may be used to electrically insulate the two sheet materials shown in FIGS. 3A and 3B;

FIGS. 3D and 3E are plan and edge views, respectively, of a transposition using the electrically conductive sheet materials shown in FIGS. 3A and 3B and the sheet of insulating material shown in FIG. 3C;

FIGS. 4A through 4D illustrate the steps of a method of preparing a notch in one edge of an electrically conductive sheet material, by folding the sheet;

FIGS. 5A through 5D illustrate the steps of the method shown in FIGS. 4A through 4D, for preparing the notch in the edge opposite to that shown in FIGS. 4A through 4D;

FIG. 6 illustrates a transposition using the prepared sheet conductors shown in FIGS. 4D and 5D;

FIGS. 7A through 7D illustrate the steps of a method of preparing a notch in one edge of an electrically conductive sheet material by folding the sheet, wherein the notch extends more than halfway through the width of the sheet material;

FIGS. 8A through 8D illustrate the steps of the method shown in FIGS. 7A through 7D, for preparing the notch in the edge opposite to that shown in FIGS. 7A through 7D;

FIG. 9 illustrates a transposition using the prepared sheet conductors shown in FIGS. 7D and 8D;

FIGS. 10A through 10C illustrate the steps of a method of preparing a notch in one edge of an electrically conductive sheet material, by cutting, folding and welding the sheet material;

FIGS. 11A through 11C illustrate the steps of the method shown in FIGS. 10A through 10C, for preparing the notch in the edge opposite to that shown in FIGS. 10A through 10C;

FIG. 12 illustrates a transposition using the prepared sheet conductors shown in FIGS. 10C and 11C; and FIGS. 13A through 13E illustrate the steps of another method of preparing a notch in a sheet of electrically conductive material.

DESCRIPTION OF THE PREFERRED EMBODIMENTS

Figure 1:
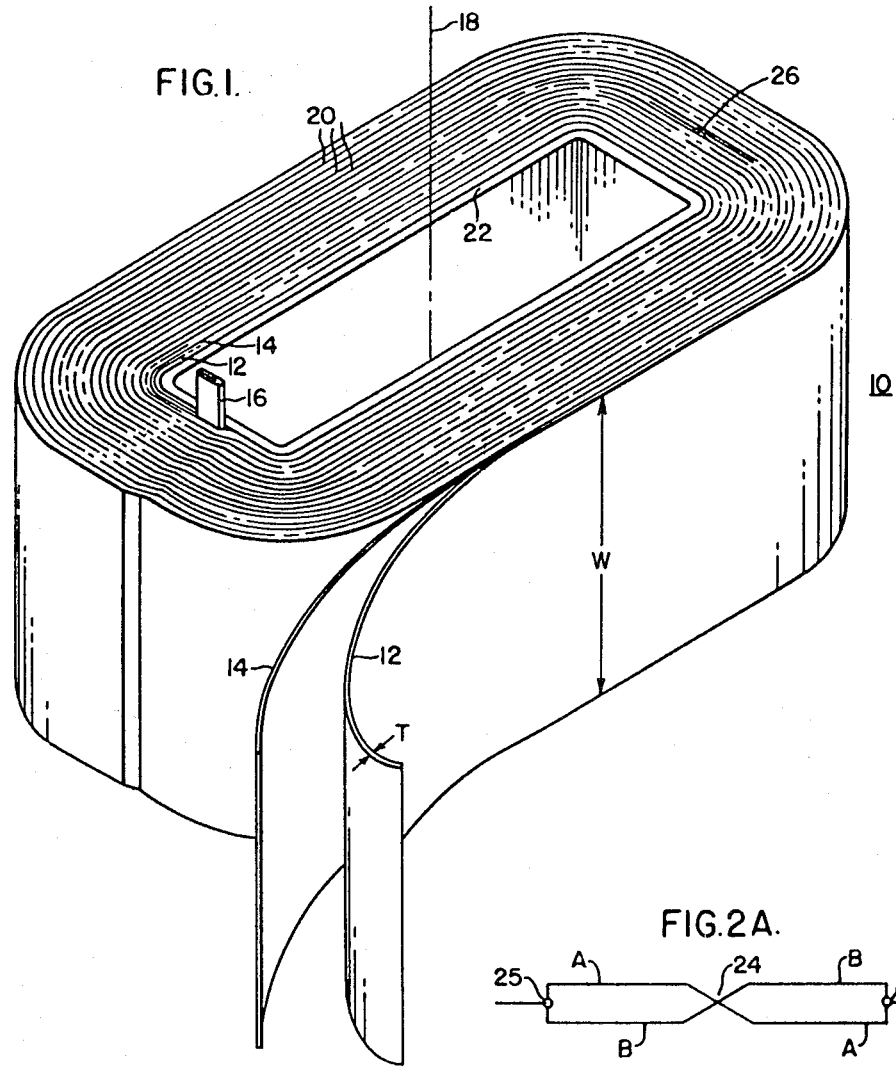
FIG. 1 is a perspective view of an electrical winding which may be constructed according to the teachings of the invention.

Referring now to the drawings, and FIG. 1 in particular, there is shown an electrical winding 10 of the type which may utilize the teachings of the invention, while winding 10 is shown as being rectangular, it may be round or any other desired shape. Electrical winding 10, which may be a primary or secondary winding for an electrical transformer, or a coil for a reactor or an autotransformer, is constructed of at least two sheets 12 and 14 of electrically conductive material, such as copper or aluminum. Sheets 12 and 14 may be strip or foil with any desired thickness T and width W, as required by the specific application. Typical thickness dimensions are in the range of 0.008 inch to 0.063 inch, and typical width dimensions are in the range of 10 inches to 56 inches, for electrical power transformers, but it will be understood that the invention will apply to sheet conductors having any desired dimensions. For example, distribution type transformers may utilize sheet conductors having smaller thickness and width dimensions.

As the thickness dimension T of the sheet material increases, it becomes more difficult to wind the sheet about a mandrel, with a good space factor. Further, as the thickness dimension T increases, the losses due to eddy currents increase. Therefore, for both mechanical and electrical reasons, when the current requirements dictate a cross-sectional area which requires a thickness dimension which exceeds, in general, 0.063 inch for power transformers, the required conductors cross-sectional area may be provided by winding the required number of sheet conductors simultaneously, and connecting the plurality of sheet conductors in parallel at the ends of the winding.

As shown in FIG. 1, sheet conductors 12 and 14 are connected to a power terminal 16, such as by welding, and the two sheet conductors are wound about a common axis 18, forming a plurality of superposed or nested conductor turns 20. The sheet materials 12 and 14 may be wound directly upon an expandable mandrel, or they may be wound about a winding tube 22, which is disposed on a mandrel.

In order to prevent the two sheet materials from electrically contacting one another, except at the ends of the winding, and at any tap connection points on the winding and from contacting the conductors of adjacent turns, the two sheet materials must be electrically insulated. The electrical insulation between conductor turns, and between the multiple conductors of each turn, may be an insulating coating disposed on one or both of the major surfaces of the sheet materials, such as an enamel coating formed of epoxy, or other good electrical insulating material, or, the electrical insulation may be one or more sheets or strips of insulating material, such as kraft paper, with the insulation being disposed between the sheets of electrically conductive material, and adjacent the outer surface of at least one of the sheets, and wound simultaneously therewith. After the winding 10 has been completed, the two sheet materials 12 and 14 will have their ends connected to a power lead (not shown), similar to the lead 16.

Figure 2A:
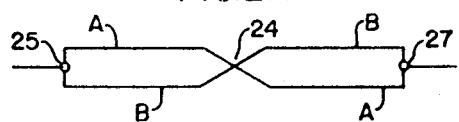
FIGS. 2A through 2D are schematic diagrams of interleaving arrangements which may utilize the teachings of the invention.

While dividing the cross-sectional area of conductive material into a plurality of parallel connected conductive elements reduces the eddy current losses of the electrical winding, the reduction in losses due to eddy currents may be offset by an increase in losses due to circulating currents in the parallel connected elements. Losses due to circulating currents may be reduced by transposing the relative positions of the parallel connected elements, in an attempt to subject all the parallel connected elements to the same net leakage flux. With two parallel connected elements, such as shown in FIG. 1, a standard transposition, wherein the radial sequence of the conductors is reversed, will produce a perfect transposition, if performed at the midpoint of the total conductor length, since each conductor will occupy the relative radial position of the other for the same conductor length. The standard transposition is shown schematically in FIGS. 2A, wherein two conductors A and B are connected in parallel between terminals 25 and 27, and transposed at transposition 24 to reverse their radial positions.

The sheet conductors 12 and 14, as shown in FIG. 1, start at the terminal 16 with sheet conductor 12 being the inside conductor, and with their relative radial positions being transposed at transposition point 26, such as sheet conductor 14 becomes the inside conductor. As will be hereinafter described, transposition 26 is performed according to the teachings of the invention.

Figure 2B:
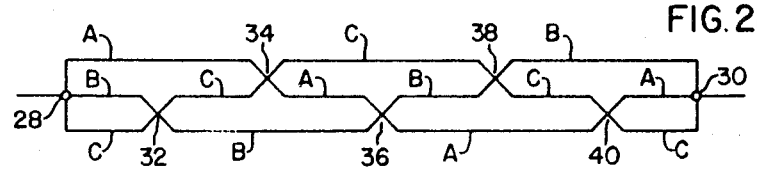

FIG. 2B is a schematic diagram illustrating how three sheet conductors A, B and C, which are connected in parallel between terminals 28 and 30, may be transposed, using all standard transpositions, to provide a perfect transposition wherein each sheet conductor successively occupies the position of all of the other sheet conductors, and for the same distance. The standard transposition alternates between the two outer conductors and the two inner conductors, until completing five transpositions. The next standard transposition, using the same pattern, would bring the A, B and C conductors back to their relative starting locations. The two inner conductors B and C are transposed at transposition 32, the two outer conductors A and C are then transposed at transposition 34, the two inner conductors A and B are then transposed at transposition 36, the two outer conductors B and C are then transposed at transposition 38, and the two inner conductors A and C are then transposed at transposition 40.

Figure 2C:
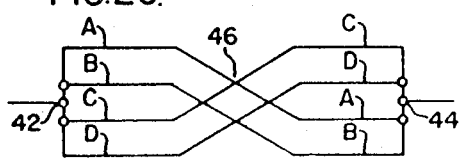

In addition to making a standard transposition with two conductors, any number of conductors may be divided into two groups, and the two groups transposed with a standard transposition. This type of transposition is shown schematically in FIG. 2C, with conductors A, B, C and D being connected between terminals 42 and 44, and transposed at transposition No. 46. Transposition 46, however, since it does not reverse the positions of the conductors, is technically not a standard transposition, and is often called a complete transposition. Also, it is not a perfect transposition, as the conductors do not successively occupy the positions of all of the other conductors.

Figure 2D:
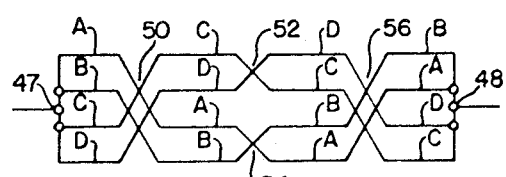

Four conductors may be perfectly transposed using a combination of standard and complete transpositions. This arrangement is shown schematically in FIG. 2D, with conductors A, B, C and D being connected in parallel between terminals 46 and 48. The first transposition point includes a complete transposition 50. The next transposition point includes two standard transpositions 52 and 54, and the next transposition point includes a complete transposition 56. This arrangement causes each conductor to occupy each of the radial locations, for the same distance. This result could also be achieved by using two standard transpositions at the first transposition point, a complete transposition at the next transposition point, and two standard transpositions at the last transposition point.

The different transposing arrangements shown in FIGS. 2A, 2B, 2C and 2D are examples of interleaving arrangements which may be used with sheet conductors, according to the teachings of the invention. Other arrangements, however, may also be used, which will become apparent hereinafter.

FIGS. 3A through 3E illustrate an interleaving arrangement for performing a standard transposition with two sheet conductors. FIG. 3A illustrates a sheet 60 of electrically conductive material having first and second edges 62 and 64, respectively, a first end 66, which may be from an electrical winding which is in the process of being wound, and a second end 68 which may be from a first supply of sheet material. An opening, notch or indentation 70 is cut in one of the edges of sheet 60, such as the second edge 64, as shown in FIG. 3A, which opening extends at least to the midpoint of the sheet width, as indicated by the centerline 72, and preferably beyond the centerline 72 by a predetermined small dimension. As illustrated in FIG. 3A, opening 70 is preferably trapezoidal in shape, having converging sides 74 and 76 which slope inwardly to a straight portion 78, which is parallel with the edges of the strip. The angle between the edge 64 of the sheet 60 and the side 74 of the opening 70, given the reference numeral 80, is thus preferably greater than 90°, with the greater the angle the more gradual the transition from the total sheet width to the "necked-down" portion 82 between the inner edge 78 of the opening 70 and the outer edge 62 of the sheet material 60. It is desirable to have a gradual transition from the maximum strip width to the minimum strip width, in order to prevent current crowding and overheating at the transposition point. In other words, a gradual transition lowers the maximum current density adjacent the transposition, and thus the temperature of the conductor is lowered accordingly.

FIG. 3B illustrates a sheet 84 of electrically conductive material having first and second edges 86 and 88, respectively a first end 90 which is from the same electrical winding as sheet 60, shown in FIG. 3A, and a second end 92 which is from a second supply of sheet material. It will be assumed for purposes of example, that sheet material 60 is the inner conductor on the electrical winding, and sheet material 84 is the outer conductor. An opening 94 is cut in sheet material 84, which is similar to the opening 70 in the sheet material 60, except that opening 94 is cut in the first edge 86 of sheet material 84 instead of being cut in its second edge. Opening 94 also preferably extends past the midpoint of the width of sheet material 84, indicated by centerline 96, with opening 94 being disposed such that it will be circumferentially aligned with opening 70 when it is in the electrical winding. Thus, when sheet material 84 is superposed on sheet material 60, the two openings 70 and 94 will overlap by a predetermined small dimension.

If sheet materials 60 and 84 are coated with an electrical insulating material, they are ready for transposing. If they are not so coated, they may be interleaved by a sheet 98 of insulating material, as shown in FIG. 3C, which has first and second edges 100 and 102, a first end 104 from the partially finished winding, and a second end 106 from a supply or roll of insulating sheet material. Sheet 98 of insulating material has two cuts which start at edges 100 and 102, respectively, and which extend inwardly for a dimension at least as long as the throat or necked down section 82. If the openings 70 and 94 overlap, cuts 108 and 110 may be aligned, since they may be cut into the sheet, without cutting the sheet in two separate pieces. If the openings 70 and 94 do not project substantially past the centerlines 74 and 96, respectively, cuts 108 and 110 may be longitudinally offset by a predetermined dimension, depending upon the dimension of the edge 78 at the inner extremity of the opening.

FIGS. 3D and 3E illustrate plan and edge views, respectively, of a transposing arrangement using sheet conductors 60 and 84, and the sheet 98 of electrical insulating material. The transposition is performed by directing the narrow portion of sheet material 60 through the opening 94 in sheet material 84, and also through the cut 108 in the insulating sheet 98, and by directing the narrow portion of sheet material 84 through the opening 70 in sheet material 60, and also through the cut 110 in the insulating sheet 98. Thus, sheet material 60, which was the inner conductor as the conductors were being wound on the mandrel, becomes the outer conductor after the transposition point. This requires that the positions of the two supply reels of electrically conductive sheet material be interchanged, after the transposition.

While the transposition shown in FIG. 3D is a complete transposition, using two electrically conductive sheet materials, it will be understood that any number of sheet materials may be prepared according to sheet material 60, and any number of sheet materials may be prepared according to sheet material 84, with the two groups being transposed as illustrated in the embodiment of the invention shown in FIGS. 3A through 3E, to perform a complete transposition. Since this embodiment requires that a certain amount of metal be removed from the conductive sheet materials, the current density in the portion of the sheet materials between the unnotched edge and the opening will be higher than in other portions of the winding. Thus, this area will have a higher temperature than the sheet conductor in the remaining portion of the electrical winding. If the temperature in the area of the transposition approaches the maximum temperature limit for the class of insulation used, the transposition points may be chosen such that they are disposed adjacent a cooling duct in the winding, which will aid in removing the heat from the transposition.

The removal of the conductive material from the sheet materials, and the greater current density adjacent the openings in the sheet material may be a disadvantage in certain applications. The embodiment of the invention shown in FIGS. 4A through 4D, FIGS. 5A through 5D, and FIG. 6, illustrates a transposition which may be made without cutting or removing any of the electrically conductive material from the sheet materials, with the opening or notch in the sheet materials being obtained entirely by folding the sheet material in a predetermined manner. The disclosed folding arrangement increases the number of layers of conductive sheet material adjacent the notch, to allow the sheet width to be reduced without a substantial increase in the current density adjacent the notch.

Each of the sheet conductors to be notched is folded along three bend lines. In this embodiment of the invention, it will be assumed that the apex or vertex of the notch extends to the midpoint of the conductor width. Further, since the sheet material is folded three times, the sheet ends up upside down when it leaves the notch, as compared with its position before entering the notch. This means that either the mandrel on which the winding is being wound must be able to be turned about an axis perpendicular to the axis of rotation of the mandrel; or the supply of sheet material must be arranged such that it may be turned over. If the transposition point is made close enough to the end of the winding, the sheet may be removed from the supply roll and easily turned over. If not, the supply roll may be taken from its support and turned over and reinserted into the support, or the support means may be specially disposed to allow the supply roll to be turned over when necessary in order to form the notch. Also, a system of guide rollers between the supply roll and the winding mandrel may be used to turn the sheet conductive material over, when required.

For purposes of example, the folds will be described from the viewpoint of keeping the end of the sheet material from the partially wound electrical winding stationary, and turning the end of the sheet material connected to the supply upside down. However, it will be understood that the winding may be turned over to make each of the notches; or the winding may be turned over to make the notch in one sheet, and the supply may be turned over to make the notch in the next sheet.

FIGS. 4A through 4D illustrate the steps in the method of preparing a notch in a sheet 120 of electrically conductive material, which has first and second edges 122 and 124, respectively, a first end 127 which is from a partially finished winding, and a second end 129 which is from the supply of sheet material. First, second and third bend lines 126, 128 and 130, respectively, are marked on the sheet conductor 120, with the first bend line 126 extending perpendicularly between the edges 122 and 124 of the sheet, and being indicated by dot-dash line 126. Since bend line 126 is perpendicular to the edges 122 and 124, its length dimension X will be the same as the width dimension of the sheet.

The second and third bend lines 128 and 130, respectively, also extend between the two edges of the sheet, starting from opposite ends of the first bend line 126 and proceeding outwardly on opposite sides of the first bend line, striking the opposite edge of the sheet material at a point which is the dimension X from the intersection of the first bend line with that edge.

If the notch is to be provided on the side of edge 124, the second bend line 128 will start at the intersection of the first bend line 126 with the first edge 122, and it will proceed generally in the direction of end 127, at an angle with respect to bend line 126 which will strike the second edge 124 at a point which is the dimension X from the point where the bend line 126 intersects the edge 124. Since bend line 126 is perpendicular to the edges 122 and 124, and since two of the sides of the triangle which include bend lines 126 and 128 and the portion of side 124 between the bend lines 126 and 128, are equal to the dimension X, the angle 132 between bend lines 126 and 128 is equal to 45°.

The third bend line 130 starts from the other end of the first bend line 126, where the first bend line 126 intersects edge 124, and it proceeds outwardly in the general direction of end 129, intersecting edge 122 at a point which is the X dimension from where the first bend line 126 intersects edge 122. Thus, the bend lines 128 and 130 are parallel with one another, and they, along with the portions of edges 122 and 124 which separate these two bend lines, form a parallelogram.

The folding of the sheet material 120 along the bend lines, may be in any desired order, and the folds may be such that the folded portion lies above, or below the plane of the unfolded portion. Regardless of the order of making the three folds, and regardless of whether the folds lie above or below the unfolded portion, or both, the notch will appear on the side of edge 124, as long as end 126 is held stationary. Further, regardless of how the bends are made, or in which order, the end not held stationary will finish upside down from its original position. Thus, as shown in FIG. 4B, the first fold may be along bend line 130 such that the folded portion will end up above the plane of the unfolded portion. The next step, which is shown in FIG. 4C, may be to fold the sheet material 140 along bend line 128, again folding the sheet such that the newly folded portion is above the plane of the unfolded portion. The last step, which is shown in FIG. 4D, is to fold the sheet material along bend line 126, which forms a notch or opening 134 on the side of edge 124, with its apex falling on the centerline of the width dimension of the sheet material. If the bend lines are prefolded, to allow them to easily fold later when a notch is to be formed, the supply of sheet material may be turned over when the first fold is made, shown in FIG. 4B. The last two folds, shown in FIGS. 4C and 4D, may then be made by twisting end 129 from the position shown in FIG. 4B, to the position shown in FIG. 4D, and the material will automatically bend along the prebent fold lines into the configuration shown in FIG. 4D. If the folds are not prebent, the supply material need only be turned over once, by providing enough slack between the supply and the folded portion to allow the slack material to be turned over and back, once the supply material is initially turned over.

After the folding step shown in FIG. 4C, it will be recognized that the notch could be formed on the side of edge 122, by turning end 127 over, which would mean the partially finished winding would have to be turned over.

In order to form a notch on side 122, without turning the winding over, the second and third bend lines start from the opposite ends of bend line 126. Specifically, FIG. 5A illustrates a sheet 140 of electrically conductive material having first and second edges 142 and 144, a first end 146 from the partially finished electrical winding, and a second end 148 which is connected to the supply of sheet material. Three bend lines 150, 152 and 154 are marked on the sheet material 140, with the first bend line 150 being perpendicular to the edges of sheet material 140. The second and third bend lines start at the intersection of the first bend line 150 with edge 144, and the intersection of bend line 150 with edge 142, respectively. The second bend line 152 extends outwardly from bend line 150 in the general direction of end 146, intersecting edge 142 the dimension X from the point where bend line 150 intersects edge 142. The third bend line extends outwardly from bend line 150, in the general direction of end 148, intersecting edge 144 the dimension X from the point where bend line 150 intersects edge 144.

The first step in preparing a notch in sheet material 140, is to fold the sheet material along one of the bend lines, such as bend line 154 as shown in FIG. 5B. The next step is to fold the sheet material along another of the bend lines, such as bend line 152, shown in FIG. 5C. The last step is to fold the sheet material along bend line 150, with this step being shown in FIG. 5D, which forms the notch or opening 156 in the side of edge 142 of the sheet material.

FIG. 6 illustrates a transposition 151 formed with sheet materials 120 and 140 after the notches 134 and 156 have been formed therein, respectively, with sheet material 120 proceeding from its position as the outer conductor in the unfinished winding, through the notch 156 in sheet material 140, to its new position as the inner conductor. Conductive sheet material 140 proceeds from its position as inner conductor in the unfinished winding, through the notch 134 in sheet material 120, to its transposed position as the outer conductor. The relative positions of the supply reels will have to be reversed after the transposition.

The two sheet conductors 120 and 140 may be insulated with a coating of electrical insulating material, disposed on one or both of their major sides, or they may be insulated with a sheet of insulating material. Since in this embodiment of the invention, the two sheets of electrically conductive material are in contact with one another at the end of their pointed openings, and the folds from one of the sheet materials are in contact with the folds from the other of the sheet materials from half the distance along each of the diagonal folds on each of the major sides of the sheet materials, it would be easier to insulate the two sheet materials from one another at the transposition point if the apex of one notch did not contact the apex of the other notch, and if the folds of the two sheets were to be spaced from one another by a predetermined short dimension.

FIGS. 7A through 7D, FIGS. 8A through 8D, and FIG. 9 illustrate an embodiment of the invention which provides a transposition similar to the transposition shown in FIG. 6, inasmuch as it is prepared entirely by folding the sheet materials, but it differs from this transposition by separating the folds of the two sheet materials from one another, and by separating the points of the notches or openings by a predetermined dimension. Thus, this embodiment of the invention has the same advantages as the transposition shown in FIG. 6, wherein the current will flow through the transposition point without a substantial increase in current density, since the current can still flow through the entire width of the sheet conductors, and it also has the advantage of being easier to insulate the conductors from one another at the transposition. The complete conductor width is present at the notch in each of the sheet materials, in the form of a plurality of layers of material, instead of being in one layer. Thus, the cross-sectional area of the conductive material is not reduced.

More specifically, FIGS. 7A, 7B, 7C and 7D illustrate the steps of a method of forming a notch on one side of a sheet material, which extends past the midpoint of the sheet width by a predetermined dimension. FIG. 7A illustrates a sheet 160 of electrically conductive material, having first and second edges 162 and 164, and first and second ends 166 and 168. The first end 166 is from a partially finished winding, and the second end 168 is from a supply of sheet material. First, second and third bend lines 170, 172 and 174, respectively, are marked on the sheet conductor 160, with the first bend line 170 extending between edges 162 and 164 of the sheet material 160, such that the bend line forms first and second angles 176 and 178 with the first edge 162, and first and second angles 180 and 182 with the second edge 164. The first and second angles 176 and 178 are less than, and greater than, 90°, respectively, and the first and second angles 180 and 182 are greater than, and less than 90°, respectively. This requirement is unlike the embodiment of the invention shown in FIGS. 4A and 5A, wherein the first bend line is disposed perpendicular to the edges of the sheet material. The angle selected for the first bend line to deviate from a line perpendicular to the edges 162 and 164 determines the dimension by which the apex of the notch in the sheet material will extend past the center of the sheet width. Since it is only necessary for each notch to extend past the sheet centerline by a small dimension, the actual deviation of the first bend line from a line perpendicular to the sheet edges may be slight.

In order to obtain a notch on the side of edge 164, which extends past the sheet centerline, the first bend line 170 should be angled such that is intersects the first edge 162 closer to the end 168 than its intersection with edge 164. Then, the second and third bend lines, which start at the ends of the first bend line 170, must extend outwardly from the bend line within the angles which are less than 90°. The first angle 176, between bend line 170 and edge 162, is less than 90°, and the second angle 182 between bend line 170 and edge 164 is less than 90°. Therefore, the second bend line must start from the intersection of the first bend line 170 with edge 162, and extend outwardly therefrom on the side of the first bend line towards end 166 of the sheet material. The length of the first bend line 170 has a dimension Y, which is greater than the width dimension of the sheet, and the dimension Y is used to determine the points at which the second and third bend lines intersect the opposite edges from their starting points. The dimension Y is marked along edge 164, from the intersection of the first bend line 170 with edge 164, with the dimension being measured towards its end 166. The second bend line extends between the first and second edges, intersecting the second edge 164 the dimension Y from the intersection of the first bend line 170 with edge 164. The third bend line 174 starts at the intersection of the first bend line 170 with edge 164, and extends outwardly therefrom within angle 182, intersecting the first edge 162 the dimension Y from the intersection of the first bend line 170 with the first edge 162.

It should be emphasized that it is important to place the second and third bend lines within angles 176 and 182, the angles which are less than 90°. If they were to be placed within angles 178 and 180, the angles greater than 90°, the resulting notch would extend less than half way across the sheet width.

The folds along the three bend lines may be made in any order, as hereinbefore described relative to the steps of forming the notch illustrated in FIGS. 4A through 4D. For example, as shown in FIG. 7B, the first fold may be along bend line 174, the next fold, illustrated in FIG. 7C, may be along bend line 172, and the last fold, illustrated in FIG. 7D, will be along bend line 170, forming a notch 184 on the side of edge 164, which extends past the centerline 188 of the sheet width by a dimension 186.

FIGS. 8A through 8D illustrate the steps necessary to provide a notch similar to notch 184, except it is formed on the side of the opposite edge. FIG. 8A illustrates a sheet 190 of electrically conductive material having first and second edges 192 and 194, a first end 196 connected to a partially finished electrical winding, and a second end 198 connected to the supply of sheet material. First, second and third bend lines 200, 202, and 204, respectively, are marked on the sheet 190 of electrically conductive material, with bend line 200 having a slope which is opposite to that of the first bend line 170 shown in FIG. 7A. In other words, the first bend line 200 forms first and second angles 206 and 208 with edge 192 which are equal to the second and first angles 178 and 176 shown in FIG. 7A. Further, bend line 200 forms first and second angles 210 and 212 with edge 194, which are equal to the second and first angles 182 and 180, shown in FIG. 7A.

The second and third bend lines are then disposed such that they fall within the angles which are less than 90°. The angle 210 is less than 90°, on the side of bend line 200 which is towards end 196, so the second bend line 202 will start from the intersection of bend line 200 with edge 194 and proceed outwardly therefrom, in the general direction of end 196, intersecting edge 192 the dimension Y from the intersection of bend line 200 with edge 192. The third bend line 204 will start at the end of bend line 200 which intersects edge 192, and it will extend outwardly therefrom, within angle 208, intersecting edge 194 the dimension Y from the intersection of bend line 200 with edge 194. As shown in FIG. 8B, sheet material 190 may be first folded along bend line 204, such that the folded portion lies above the plane of the unfolded portion, the next step, as shown in FIG. 8C, may be performed by folding the sheet material along bend line 202, such that the folded portion again lies above the plane of the unfolded portion, and the last step shown in FIG. 8D, is to fold the sheet material along bend line 200, which automatically forms the notch or opening 214 in the side of edge 192. As illustrated in FIG. 8D, the notch 214 extends past the centerline 189 of the sheet by a dimension given the reference numeral 216.

FIG. 9 illustrates a transposition 220 formed with sheet materials 160 and 190, after the notches 184 and 214 have been formed therein, respectively, with sheet material 160 proceeding from its position as the outer conductor in the unfinished winding, through notch 214 in sheet material 190, to its new position as the inner conductor. Sheet material 190 from its position as inner conductor, through notch 184 of sheet material 160, to its new position as the outer conductor. It will be noted that the apex of each of the notches is separated, from the other, in this embodiment, by a dimension given the reference numeral 222, and the edges of the folds of the two sheet materials are also separated from each other by a dimension given the reference numeral 224.

Sheet conductors 160 and 190 may be electrically insulated with a coating of insulating enamel, or with a separate strip or sheet of insulating material disposed between adjacent conductor turns. The insulating material may be slit, as shown in FIG. 3C, in order to insulate the transposition 220.

FIGS. 3A through 3E illustrate a transposition of sheet conductors which involves cutting the sheet conductor, and removing a portion thereof. This is perhaps the least complicated arrangement, but it does reduce the width dimension of the sheet conductor without increasing the cross-sectional area of the sheet adjacent the notch. Therefore, the current density will increase as it flows through the narrow portion of the sheet conductor, which may be a disadvantage in some applications. The embodiments of the invention shown in FIGS. 6 and 9 provide a transposition without cutting the sheet conductors, providing a plurality of layers of sheet thicknesses adjacent the notch, by folding the sheet materials in a predetermined manner. Thus, there is no conductive material removed from the sheet materials, and the current can flow through the transposition without a substantial increase in current density adjacent the notch. The latter mentioned embodiments require that the sheet conductor be turned over as it progresses through the notch, which requires that either the side of the sheet material from the winding be turned over, or the side of the sheet material from the supply be turned over.

This involves apparatus which will turn the winding mandrel, or apparatus which will turn the winding supply over, or at least some auxiliary means for turning the sheet over between the mandrel and the supply. Since this requirement may be undesirable in certain instances, FIGS. 10A through 10C, FIGS. 11A through 11C, FIG. 12 and FIGS. 13A through 13E, illustrate embodiments which involve cutting, folding and joining, which provide transposition arrangements which increase the conductor cross-sectional area at the notch, without requiring that the sheet material be turned over.

More specifically, FIG. 10A illustrates a sheet 230 of electrically conductive material, having first and second edges 236 and 238, respectively, and first and second ends 239 and 241. The first step is to mark sheet 230 with a line 240 perpendicular to the edges of the sheet, and to mark lines 242 and 244. If the notch is to appear in edge 238, lines 242 and 244 starts at the intersection of line 240 with edge 236, and extend outwardly therefrom in the general direction of ends 239 and 241, respectively. Lines 242 and 244 create angles 231 and 233, respectively, with the edge 236, with the angle being selected to be 45° in FIG. 10A. The angle selected may be any desired angle, with the specific angle determining the width of the notch at the edge of the sheet. More conductive material will be removed from the sheet, as the angle is reduced in magnitude, but since it increases the width of the notch at the outer edge of the sheet, it directs the current flowing at the sheet conductor inwardly over a longer distance, resulting in lowering the maximum current density at certain areas in the sheet. In other words, a smaller angle promotes a more uniform transition from the maximum to the minimum sheet width, with less current crowding, and consequently a lower maximum current density. The angle of 45° was selected for this specific embodiment, as the folded portion of the sheet will be aligned with an edge of the sheet.

Once the sheet material 230 is marked, it is cut along line 240, to provide two separate portions 232 and 234. The next step is to fold portions 232 and 234 along bend lines 242 and 244, respectively, as shown in FIG. 10B. The next step, shown in FIG. 10B, is to mark portions 232 and 234 with lines 246 and 248, respectively, which are perpendicular to edge 236, and which intersect the folded edges at a point which is slightly less than the halfway point across the width of the sheet, measured from edge 236. Portions 232 and 234 are cut along lines 246 and 248, and the cut ends produced are mechanically and electrically joined, as shown in FIG. 10C, by any suitable means, such as welding, brazing, soldering or crimping. This forms a notch 252 in edge 238, which extends just past the centerline of the sheet width. The welded joint, in this embodiment has two thicknesses of sheet material, which reduces the current density in this area.

An alternative to the progressive steps of cutting, folding and cutting, prior to the joining step, would be to perform all of the cutting required in the first step. This may be accomplished by cutting the sheet material 230, as illustrated in FIG. 10A, along dotted lines 254, 256 and 258, and along line 240. The folds along bend lines 242 and 244 may then be made and the two portions 232 and 234 are ready for the joining step shown in FIG. 10C.

The sheet conductor that sheet 230 is to be interleaved with, is prepared in like manner, except the notch is formed in the opposite edge. Specifically, FIG. 11A illustrates a sheet 260 of electrical conductive material having first and second edges 266 and 268, respectively, and first and second ends 269 and 271. The first step is to mark the sheet material with a line 270 which is perpendicular to the edges of the sheet material, and to mark lines 272 and 274 which start at the intersection of line 270 with edge 268 and extend outwardly toward ends 269 and 271, respectively. The next step is to cut the sheet material along line 270, to provide first and second portions 262 and 264, and then portions 262 and 264 are folded along bend lines 272 and 274, as shown in FIG. 11B. The next step is to mark portions 262 and 264 with lines 276 and 278. Which are perpendicular to the edge 268, intersecting the fold lines at a point which is less than halfway across the strip width. Portions 262 and 264 are then cut along lines 276 and 278, and the resulting cut ends are electrically and mechanically joined at 280, as shown in FIG. 11C to provide a notch 282 in the edge 266, which extends past the midpoint of the strip width, measured from edge 266.

FIG. 12 illustrates a transposition 290 formed from sheets 230 and 260, after notches 252 and 282 have been formed therein, with sheet material 230 proceeding through the notch 282 in the sheet material 260, and with the sheet material 260 proceeding through the notch 252 in sheet material 230. Since the apex of each of the notches extends past the centerline, there will be no interference between the notches, as shown in FIG. 12, which allows the transposition to be adequately insulated with a separate sheet of insulating material, or the sheet conductors may be coated with a layer of electrical insulating material. The relative positions of the supply reels must be reversed after the transposition.

FIGS. 13A through 13E illustrate how a notch may be formed in the edge of a sheet material, according to the teachings of the embodiment of the invention shown in FIGS. 10A through 10C, and FIGS. 11A through 11C, using an angle between the bend lines and the edge from which they initiate, which is less than 45°. For purposes of example, this angle is shown in FIG. 13A as being 30°, which provides a good compromise between the amount of conductor removed from the sheet, versus the amount of current crowding during the transition from the maximum to the minimum width dimensions of the sheet. FIG. 13A illustrates a sheet 300 of electrically conductive material having first and second edges 301 and 303, respectively, and first and second ends 305 and 307, respectively. The first step is to mark a line 302 which extends perpendicularly between edges 301 and 303, and to mark bend lines 308 and 310 which start at the intersection of line 302 with edge 303 and proceed outwardly therefrom at angles 312 and 314, respectively, towards ends 305 and 307, respectively. As hereinbefore stated, angles 312 and 314 are 30° in this embodiment. The first step is to cut the sheet material 300 along line 302, and then bend the resulting portions 304 and 306 along their respective bend lines 308 and 310. The folding of the portions 304 and 306 is shown in FIG. 13B. Since the angles 312 and 314 between the bend lines and edge 303 are less than 45°, folding the portions 304 and 306 along bend lines 308 and 310 will cause the folded portion to extend past edge 303, as shown in FIG. 13B. The next step is then to fold the portions which extend past line 303, along a line which is aligned with the edge 303. This will form structures as shown in FIG. 13C with the edge of the newly folded portion being aligned with the folds which were made along bend lines 308 and 310. The next step is to cut portions 304 and 306, as illustrated in FIG. 13C, along lines 316 and 318, respectively, with the newly cut portions being electrically and mechanically joined along line 320, as shown in FIG. 13D. The sheet material to be interleaved with sheet 300, would then be prepared in a similar manner, except bend lines 308 and 310 would start from the end of line 302 which intersects edge 301.

The structure shown in FIG. 13D provides three layers of conductive sheet material at the joint 320. An additional layer of sheet material may be provided at this joint, by folding the sheet material along lines 324 and 326 after portions 304 and 306 are cut along lines 316 and 318.

After the portions 304 and 306 are folded along bend lines 324 and 326, portions 304 and 306 will be as shown in FIG. 13E, and they may be joined electrically and mechanically along line 328.

In summary, there has been disclosed new and improved methods of providing the notches or openings in the edges of the sheet materials which enable sheet conductors to be transposed. Using the transposing arrangements for sheet materials disclosed herein, and the methods for providing the notches in the sheet materials, electrical windings formed of sheet materials may be constructed with a plurality of sheets connected in parallel, to obtain the desired current carrying capacity, and reduce the eddy current losses, without an offsetting increase in losses due to circulating currents in parallel connected conductors. The disclosed transposing structures and methods teach how the desired radial transposition of parallel connected sheet materials may be quickly and easily performed, with a minimum manufacturing cost, and without unduly increasing the current density adjacent the transposition.

We claim as our invention:

1. A method of forming a notch in one of the edges of a sheet of electrically conductive material having first and second edges and first and second ends, comprising the steps of:

folding the sheet along a first bend line which extends between the first and second edges of the sheet, said first bend line having a predetermined dimension, folding the sheet along a second bend line which starts at the first edge of the sheet at the point where the first bend line intersects the first edge, and extends to a point on the second edge of the sheet which is said predetermined dimension from the point where the first bend line intersects the second edge, and folding the sheet along a third bend line which is parallel with said second bend line, said third bend line starting at the second edge of the sheet at the point where the first bend line intersects the second edge, and extending to a point on the first edge of the sheet which is said predetermined dimension from the point wherein the first bend line intersects the first edge.

2. The method of claim 1, wherein said first bend line is substantially perpendicular to the first and second edges of the sheet material.

3. The method of claim 1, wherein said first bend line intersects the first edge of the sheet closer to the first end of the sheet than the intersection of the first bend line with the second edge of the sheet, with said second bend line extending from said first bend line towards the second end of the sheet, and said third bend line extending from said first bend line towards the first end of the sheet.

4. A method of transporting the relative positions of first and second superposed sheet materials having first and second edges comprising the steps of forming a notch in the first edge of the first sheet material by folding the first sheet along a first bend line which extends between the first and second edges of said sheet, said first bend line having a predetermined dimension, folding the sheet along a second bend line which starts at the first edge of said sheet at the point where the first bend line intersects the first edge, and extends to a point on the second edge which is said predetermined dimension from the point where the first bend line intersects the second edge, and folding the sheet along a third bend line which is parallel with said second bend line, said third bend line starting at the second edge of the sheet at the point where the first bend line intersects the second edge, and extending to a point on the first edge which is said predetermined dimension from the point where the first bend line intersects the first edge, forming a notch in the second edge of the second sheet material by folding the second sheet along a first bend line which intersects the first and second edges of said sheet, said first bend line having said predetermined dimension, folding the sheet along a second bend line which starts at the second edge of said sheet at the point where the first bend line intersects the second edge, and extends to a point on the first edge which is said first predetermined dimension from the point where the first bend line intersects the first edge, and folding the sheet along a third bend line which is parallel with said second bend line, said third bend line starting at the first edge of the sheet at the point where the first bend line intersects the first edge, and extending to a point on the second edge which is said predetermined dimension from the point where the first bend line intersects the second edge, and transposing the relative positions of said first and second sheet materials by directing the first sheet through the notch in the second sheet, and by directing the second sheet through the notch in the first sheet.

5. The method of claim 4, wherein the first bend lines in each of said first and second sheet materials are perpendicular to the first and second edges of the sheet materials.

6. The method of claim 4, wherein the first bend line in said first sheet material forms first and second predetermined angles with the first edge of the sheet, with said first and second angles being less than and greater than 90°, respectively, and said first bend line in said second sheet material forms first and second predetermined angles with the first edge of the sheet, with the first angle in said second sheet being substantially equal to the second angle in said first sheet, and with the second angle in the second sheet being substantially equal to the first angle in said first sheet, said second bend line intersecting the first angle in said first sheet material, and said third bend line intersecting the second angle in said second sheet material.

7. A method of forming a notch in one of the edges of a sheet of electrically conductive material having first and second edges which define a predetermined width dimension, comprising the steps of:

cutting said sheet material along a first line perpendicular to its first and second edges to form first and second portions having cut ends, folding each of said portions along first bend lines which start at the corner of its cut end joined by the first edge, and intersect the second edge a predetermined distance from the corner of its cut end joined by the second edge, to form a triangular point on each cut end of said first and second portions, folding any material which extends past the first edge, after folding along the first bend lines, along second bend lines which coincide with the first edge.

cutting each of the triangular points on said first and second portions along second cut lines perpendicular to the first edge, starting at the first edge a predetermined dimension from the extreme end of its triangular point, and joining said first and second portions mechanically and electrically at the second cut lines.

8. The method of claim 7, wherein said first predetermined bend lines intersect the second edges of said first and second portions at a point whose distance from the intersection of the first cut line with the second edge is equal to the width dimension of said sheet, forming triangular points having a 45°angle, wherein the first cut lines coincide with the first edge after the first and second portions are folded along the first bend lines.

9. The method of claim 7, wherein said first predetermined bend lines intersect the second edges of said first and second portions at a point whose distance from the intersection of the first cut line with the second edge is greater than the width dimension of said sheet, forming triangular points having an angle less than 45°.

10. The method of claim 7, wherein said first predetermined bend lines intersect the second edge of said first and second portions at a point whose distances from the intersection of the first cut line with the second edge is that necessary to form triangular points having an angle of 30°.

11. The method of claim 10, wherein after cutting each of the triangular points on said first and second portions, the material folded along said second bend lines, is folded along third bend lines which extend from the intersection of the second cut lines and the first bend lines to the first edge of the first and second portions.

12. A method of transposing the relative positions of first and second superposed sheet materials having first and second edges which define a predetermined width dimension comprising the steps of:

forming a notch in the first edge of the first sheet material by cutting said first sheet material along a line perpendicular to its first and second edges to form first and second portions having cut ends, folding each of said portions along bend lines which start at the corner of its cut end joined by the second edge, and intersecting the first edge at a point whose distance from the corner of its cut end joined by the second edge is at least equal to the predetermined width dimension of the sheet, to form a triangular point on each cut end of said first and second portions, folding any material which extends past the second edge, after folding along the first bend lines, along bend lines which coincide with the second edge, cutting each of the triangular points on said first and second portions along second cut lines perpendicular to said second edge, starting at the second edge a predetermined dimension from the extreme ends of its triangular point, which predetermined dimension is not greater than one-half the width dimension of said sheet, welding said first and second portions together at the second cut lines, forming a notch in the second edge of the second sheet material by cutting said second sheet material along a first cut line perpendicular to its first and second edges, to form first and second portions having cut ends, folding each of said portions along first bend lines which start at the corner of its cut end joined by the first edge, and intersecting the second edge at a point whose distances from the corner of its cut end joined by the second edge is at least equal to the predetermined width dimension of the sheet, to form a triangular point on each cut end of said first and second portions, folding any material which extends past the first edge, after folding along the first bend lines, along bend lines which coincide with the first edge, cutting each of the triangular points on said first and second portions, along second cut lines perpendicular to said first edge, starting at the first edge a predetermined dimension from the extreme end of its triangular point, which predetermined dimension is not greater than one-half the width dimension of said second sheet, welding said first and second portions of said second sheet together at the second cut lines, and transposing the relative positions of said first and second sheet materials by directing the first sheet material through the notch in the second sheet material, and by directing the second sheet material through the notch in the first sheet material.

* * * * *